Patented Feb. 5, 1952

2,584,784

UNITED STATES PATENT OFFICE 2,584,784

SALTS OF 1-SALICYLALAMINOGUANIDINE

Charles B. Biswell, Woodstown, N. J., assignor to E. I. du Pont de Nemours & Company, Wilmington, Del., a corporation of Delaware No Drawing. Application May 21, 1949, Serial No. 94,755

8 Claims. (Cl. 260—404.5)

This invention relates to salts of 1-salicylalaminoguanidine and particularly to the higher aliphatic salts thereof and to methods of preparing them.

Petroleum products, such as gasoline, fuel oils, lubricating oils and greases tend to oxidize and deteriorate in the presence of oxygen during storage and use. It has become common practice to inhibit such oxidation and deterioration by adding to such petroleum products phenols, amines and aminophenols, commonly called antioxidants. While the use of such antioxidants has met with considerable success, the petroleum products are frequently brought into contact with copper or copper compounds, or become contaminated with copper compounds, which catalyze the oxidation and deterioration of the petroleum products and also of the antioxidants contained therein. It has, therefore, become necessary to also add to the petroleum products other materials which will overcome the catalytic effect of copper and compounds containing it, such other materials being called metal deactivators or copper deactivators.

Clarkson and Pedersen, in Patent 2,353,690, disclose 1-salicylalaminoguanidine to be a copper deactivator and that it may be employed, together with an antioxidant, in organic substances normally subject to oxidation and containing or in contact with copper and copper-containing metals and compounds. 1-salicylalaminoguanidine melts at about 102° C., is rather expensive and is not too soluble in organic products and hence presents some difficulties in its incorporation into organic products.

It is an object of my invention to provide novel salts of 1-salicylalaminoguanidine and particularly higher aliphatic carboxylic acid salts thereof. Another object is to provide new compounds which are particularly effective as antioxidants and also as copper deactivators for organic substances which tend to oxidize and deteriorate during storage and use. A further object is to provide new compounds which are useful as antioxidants and copper deactivators and which also have other desirable properties whereby they can be more readily incorporated in the organic substance and which, at the same time, are relatively cheap to use. Other objects are to provide new compositions of matter. Still other objects are to advance the art.

The above and other objects may be accomplished in accordance with my invention which comprises equimolecular salts of 1-salicylalaminoguanidine and an aliphatic carboxylic acid containing 6 to 40 carbon atoms and consisting of carbon and hydrogen atoms and 1 to 2 carboxyl groups, which salt melts below 100° C. My invention also comprises a simple and inexpensive method for preparing such salts by mixing equimolecular proportions of aminoguanidine bicarbonate, salicylaldehyde and the aliphatic acid, in the presence or absence of an inert liquid reaction medium, and heating the mixture at a temperature of about 65° C. to about 85° C.

Such salts are new chemical compounds. I have found that such salts are very materially more stable than the base, 1-salicylalaminoguanidine. When 1-salicylalaminoguanidine is stored in a glass bottle in the light, it develops a dark color in about 2 weeks. On the other hand, the salts of my invention appear to be stable under such conditions almost indefinitely. I have further found that such salts are particularly effective as antioxidants for petroleum products, aromatic amines and DDT formulations. Furthermore, such salts are particularly effective as copper deactivators, that is, they overcome the effect of copper, copper-containing metals and copper comounds to catalyze oxidation of organic products generally and to a wholly unexpected extent. Thus, my salts may be employed as both the antioxidant and copper deactivator in petroleum products and the like and make unnecessary the heretofore common practice of adding two independent agents to accomplish these two functions.

1-salicylalaminoguanidine monoacetate (M. P. 185° C.), 1-salicylalaminoguanidine monobenzoate (M. P. 170° C.) and 1-salicylalaminoguanidine monosebacate (M. P. 193° C.) are high melting materials and, like the base, are only slightly soluble in hydrocarbons. On the other hand, the salts of my invention unexpectedly melt below 100° C. and are considerably more soluble in organic substances and particularly in petroleum products and other hydrocarbons. Accordingly, the salts of my invention can be more readily incorporated in the organic substances to be stabilized. Furthermore, such salts can be prepared at a cost of approximately one-third the cost of the free base.

The salts of my invention are the equimoleculer salts of 1-salicylalaminoguanidine and the aliphatic carboxylic acid, that is, the salts formed from equimolecular proportions of the 1-salicylalaminoguanidine and the carboxylic acid. Also, the salts of my invention are derived from aliphatic carboxylic acids which contain from 6 to 40 carbon atoms and consist of carbon and hydrogen atoms and 1 to 2 carboxyl groups, and particularly those which contain only one carboxyl group. The acids may contain alicyclic rings, such as those present in the naphthenic acids and in linoleic acid dimer. Representative acids, which may be employed to form the salts of my invention, are—

Oleic acid
Naphthenic acids
Caproic acid

Lauric acid
Palmitic acid
Stearic acid

Phenylstearic acid
Linoleic acid dimer
Linoleic acid
Capric acid
Myristic acid
Arachidic acid
Behenic acid
Cerotic acid
Melissic acid
Decylenic acid
Undecylenic acid
Erucic acid
Caprylic acid The salts, which I have found to be most effective and desirable and hence which I prefer, are 1-salicylaminoguanidine monoleate, 1-salicylalaminoguanidine mononaphthenates, and 1-salicylalaminoguanidine mono - linoleic acid dimer. The naphthenic acids are usually obtained from crude petroleum or its distillates as mixtures of homologous aliphatic carboxylic acids containing from 7 to about 20 carbon atoms and a cyclopentane ring carrying acyclic side chains with the carboxyl groups in the side chains and usually on the ends of the side chains. The naphthenic acid salts, specifically disclosed herein, were prepared from a mixture of naphthenic acids having an average molecular weight of 242, which corresponds to an average of approximately 15 carbon atoms in each acid molecule. The linoleic acid dimer is a carboxylic acid of the following formula—

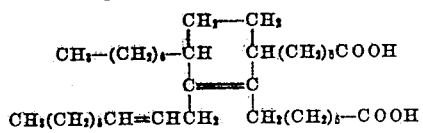

The salts of my invention are preferably prepared in substantially quantitative yields by mixing substantially equimolecular proportions of the carboxylic acid, salicylaldehyde and aminoguanidine bicarbonate and heating with agitation at temperatures of from about 65° C. to about 85° C. While the reaction may be carried in the absence of a reaction medium, I generally prefer to mix the reactants in an inert liquid reaction medium, such as the aliphatic alcohols, water and aromatic hydrocarbons. When an alcohol or an aromatic hydrocarbon is employed as the reaction medium, the solid product will usually be precipitated by adding water, followed by filtering, washing and drying. When water or a mixture of alcohol and a large proportion of water is employed as the reaction medium, the product will form as a precipitate and may then be separated by filtering, washing and drying. Preferably, the aliphatic alcohols are those which contain 1 to 4 carbon atoms, such as methyl, ethyl, isopropyl and tertiary butyl alcohols. Liquid aromatic hydrocarbons, which have been employed satisfactorily, are benzene, toluene and the xylenols. Preferably, the reaction is carried out in a liquid aliphatic alcohol as the reaction medium, and particularly methyl alcohol.

The compounds, so prepared, are believed to have the following structure:

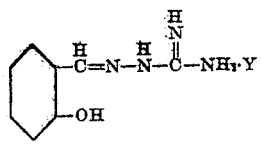

wherein Y is the organic acid molecule.

In order to more clearly illustrate the preferred method of preparing the salts of my invention, the following examples are given:

EXAMPLE I

Equimolecular quantities of salicylaldehyde, aminoguanidine bicarbonate, stearic acid and one-third part by weight (based on the sum of the other three) of methanol were heated together for four hours at 65° to 70° C. The reaction mass was diluted with sufficient water to precipitate the product, which was filtered, washed with water, and dried. A quantitative yield of 1-salicylaminoguanidine monostearate, which melted at 80° C. and analyzed 11.92% nitrogen by the Dumas method, was obtained. The calculated nitrogen for 1-salicylaminoguanidine monostearate is 12.15%.

EXAMPLE II

A 500 cc. glass reaction flask was charged with 34 g. aminoguanidine bicarbonate, 25 cc. methanol and 32 g. salicylaldehyde. To this mixture at 65°–70° C. was added gradually during one hour 70 g. oleic acid. There appeared to be no reaction between the salicylaldehyde and the aminoguanidine until the oleic acid was added. The charge was agitated 3 hours longer at 65°–70° C. and then added to an agitated mixture of 200 g. water and 100 g. ice. The granular product was filtered, washed with water, and dried in the air. The yield of 1-salicylalaminoguanidine monoleate, melting range 60°–65° C., was 115 g.

EXAMPLE III

A mixture of 408 g. aminoguanidine bicarbonate, 373 g. salicylaldehyde, 840 g. oleic acid and 300 cc. methyl alcohol was agitated at 65° C. to 70° C. for 3 hours in a 3 liter glass flask. The reaction mass was added to 3600 cc. water with stirring. The solid product was filtered, washed with water and air dried. The yield of 1 - salicylalaminoguanidine monoleate, melting range 60° C. to 65° C., was 1426 g.

EXAMPLE IV

A mixture of 27 g. aminoguanidine bicarbonate, 24 g. salicylaldehyde and 60 g. oleic acid was agitated at 80° C. to 85° C. for 3.5 hours. The product was discharged into a pan and allowed to cool. There was obtained 97 g. of 1-salicylalaminoguanidine monoleate melting in the range of 63° C. to 66° C.

Other salts of my invention, which were prepared by the method of Examples I to III above, and their approximate melting points, are as follows:

|  | M. P., ° C. |
|---|---|
| 1-salicylalaminoguanidine mononaphthenate | Liquid at room temp. |
| 1-salicylalaminoguanidine mono-linoleic acid dimer | 52 |
| 1-salicylalaminoguanidine monolaurate | 85 |
| 1-salicylalaminoguanidine monocaproate | 86 |
| 1-salicylalaminoguanidine monocaprylate | 95 |
| 1-salicylalaminoguanidine monopalmitate | 80 |
| 1 - salicylalaminoguanidine monophenylstearate | 86 |

The salts of my invention may also be similarly prepared from the nitric acid, hydrochloric acid and phosphoric acid salts of aminoguanidine, employing a polar reaction medium, such as water, low molecular weight alcohols or mixtures of water and such alcohols. When such method is employed, it is necessary to also add an alkali, such as sodium hydroxide, to neutralize the liberated inorganic acid. Also, the salts may be prepared by condensing salicylaldehyde with aminoguanidine nitrate, hydrochloride or phosphate, isolating the free base by neutralizing with a potash solution and then reacting the 1-salicylalaminoguanidine with the aliphatic carboxylic acid.

As has been pointed out heretofore, 1-salicylalaminoguanidine has been disclosed to be a copper deactivator. However, the fatty acids are neither antioxidants nor metal deactivators. Accordingly, it would be expected that the conversion of 1-salicylalaminoguanidine to its fatty acid salts would result in compounds having a weight effectiveness of one-half or less of that of 1-salicylalaminoguanidine, since the salts have a molecular weight of 2 or more times that of the base and hence a given weight of the salt will contain one-half or less of the number of moles which would be present in a corresponding weight of the base. Contrary to such expectation, I have found that the salts have a weight effectiveness at least equal to that of the base, and, usually, have a greater weight effectiveness. Thus, the salts have a considerably greater molecular effectiveness than the base. This is shown by the following examples:

EXAMPLE V

For the purpose of illustrating the metal deactivating characteristics of these compounds, I have chosen to show the property of salicylalaminoguanidine oleate of suppressing the catalytic activity of copper in gasoline. The samples of gasoline, used in the following tests, were completely refined thermal cracked naphtha untreated with chemical agents such as dyes, antioxidants and anti-knocks. The compounds of the present invention were tested in accordance with A. S. T. M. method D522-46 for the gum stability of gasoline. The results of this test are expressed in terms of "induction period" (in minutes), the period required for oxygen obsorption to begin. N-normal butyl-p-aminophenol, abbreviated BAP, has been chosen as a representative gasoline antioxidant. It was added in small quantity to gasoline containing no copper, to the same gasoline containing one part per million of dissolved copper added as the oleate, and to gasoline containing both the dissolved copper and salicylalaminoguanidine oleate.

The experimental results are given in the following Table I:

Table I

| Concentration | | Deactivator | Conc., Wt. Per Cent | Induction Period, Minutes |
|---|---|---|---|---|
| BAP, Wt. Per Cent | Copper, P. P. M. | | | |
| 0.0 | 0.0 | None | | 120 |
| 0.002 | 0.0 | ---do--- | | 423 |
| 0.002 | 1.0 | ---do--- | | 170 |
| 0.002 | 1.0 | Salicylalaminoguanidine oleate | 0.0005 | 391 |
| 0.002 | 1.0 | ---do--- | 0.001 | 430 |

It will be observed that the catalytic effect of copper is counteracted by this compound.

EXAMPLE VI

To illustrate the utility of the compounds of this invention as antioxidants for gasoline, they were evaluated in cracked gasoline which had been thoroughly refined to remove metals. The antioxidant characteristics were compared with 2,6-ditertiarybutyl-4-methylphenol which is a well established commercial gasoline anti-oxidant.

The various products shown below were added at 0.005% by weight to the gasoline and the induction periods were then determined by the method described in Example V. The weight effectiveness of 2,6 - ditertiarybutyl - 4 - methylphenol, which at 0.005 wt. percent increased the induction period from 185 to 243 minutes, was arbitrarily assigned the molar efficiency of 100.

The experimental results are given in the following Table II:

Table II

| Antioxidant | Induction Period, Minutes | Per Cent Efficiency— | |
|---|---|---|---|
| | | Wt. Basis | Molar Basis |
| None | 185 | | |
| 2,6-ditertiarybutyl-4-methylphenol | 243 | 100 | |
| 1-Salicylalaminoguanidine base | 293 | 186 | 100 |
| 1-Salicylalaminoguanidine mononaphthenate | 248 | 109 | 139 |
| 1-Salicylalaminoguanidine monolaurate | 271 | 148 | 169 |
| 1-Salicylalaminoguanidine monocaproate | 268 | 143 | 136 |
| 1-Salicylalaminoguanidine monolinoleic acid dimer | 256 | 122 | 174 |
| 1-Salicylalaminoguanidine monoleate | 255 | 120 | 167 |

It will be observed that the compounds of this invention are effective gasoline antioxidants and that their molar effectiveness is much higher than the salicylalaminoguanidine base.

EXAMPLE VII

As another example of the usefulness of the compounds of this invention, samples of a commercial unstabilized calcium soap grease were treated with 0.5% by weight of several different organic acid salts of salicylalaminoguanidine. The products were incorporated into the grease samples by working the grease and the salt together on a porcelain plate with a spatula for one hour.

The grease samples were subjected to an accelerated oxidation stability test. The particular test used is commonly referred to as the "Accelerated Norma-Hoffman Stability Test" and is described in the proceedings of the American Society for Testing Materials, volume 38, part II, 1938, in an article entitled, "Some applications of an accelerated test for determining the chemical stability of lubricating greases." In this test a weighted sample of the grease to be tested is charged into a glass container, with or without brass catalyst, and the container is placed in a suitable bomb and subjected to a pressure of 110 pounds of oxygen at 210° to 212° F. for a certain number of hours or until the pressure has dropped a certain number of pounds.

In these experiments, all of the samples were run in the presence of brass. Included in the products tested were samples treated with phenyl-α-naphthylamine, which is a conventional grease stabilizer having wide commercial application, and with salicylalaminoguanidine base, respectively. The results are shown in Table III:

Table III

| Stabilizers | Norma-Hoffman Stability Test—Hours to 25 lbs./sq. in. pressure drop |
|---|---|
| None (unstabilized) | 14 |
| 0.5% phenyl-α-naphthylamine | 55 |
| 0.5% 1-salicylalaminoguanidine base | 104 |
| 0.5% 1-salicylalaminoguanidine monocaproate | 150 |
| 0.5% 1-salicylalaminoguanidine monocaprylate | 144 |
| 0.5% 1-salicylalaminoguanidine monolaurate | 123 |
| 0.5% 1-salicylalaminoguanidine monopalmitate | 126 |

Still other examples and tests, illustrating the effectiveness of my new compounds as antioxidants and as metal deactivators, are given in my copending application Serial No. 94,756 filed May 21, 1949, now Patent 2,580,881, issued Jan. 1, 1952, in which compositions, composed of petroleum products or secondary aromatic amines and salts of 1-salicylalaminoguanidine, are claimed. Furthermore, the novel salts of my invention are also effective to stabilize DDT formulations and to deactivate copper and its catalytically active compounds in organic substances generally.

It will be understood that the foregoing examples have been given for illustrative purposes solely and that my invention is not limited to the specific embodiments disclosed therein. Salts, other than those specifically disclosed but coming within the broad scope of my invention, are also contemplated and can be made by the process of my invention.

It will be apparent that I have provided novel compounds and a novel and simple method of preparing them. Such salts have novel and unpredictable properties, whereby they may be more readily incorporated in organic substances and which render them unexpectedly effective, both as antioxidants and as copper deactivators. Furthermore, they are considerably cheaper to produce than 1-salicylalaminoguanidine, whereby equivalent or better results may be obtained at less cost. Still further, they are very considerably more stable than 1-salicylalaminoguanidine, whereby they can be stored over longer periods of time pending their use without substantial loss of their effectiveness or other desirable properties. Therefore, it will be apparent that my invention constitutes a very valuable advance in the art.

I claim:

1. An equimolecular salt of 1-salicylalaminoguanidine and an aliphatic carboxylic acid containing 6 to 40 carbon atoms and consisting of carbon and hydrogen atoms and 1 to 2 carboxyl groups, said salt melting below 100° C.

2. An equimolecular salt of 1-salicylalaminoguanidine and an aliphatic carboxylic acid containing 6 to 40 carbon atoms and consisting of carbon and hydrogen atoms and 1 carboxyl group, said salt melting below 100° C.

3. An equimolecular salt of 1-salicylalaminoguanidine and an aliphatic carboxylic acid of the class consisting of acids containing 6 to 24 carbon atoms and consisting of carbon and hydrogen atoms and 1 carboxyl group and lionleic acid dimer.

4. An equimolecular salt of 1-salicylalaminoguanidine and an aliphatic carboxylic acid containing 6 to 24 carbon atoms and consisting of carbon and hydrogen atoms and 1 carboxyl group.

5. 1-salicylalaminoguanidine monoleate.

6. The mononaphthenic acid salts of 1-salicylalaminoguanidine.

7. 1 - salicylalaminoguanidine mono - linoleic acid dimer.

8. An equimolecular salt of 1-salicylalaminoguanidine and a member of the group consisting of aliphatic and alicyclic carboxylic acids containing 6 to 40 carbon atoms and consisting of carbon and hydrogen atoms and 1 to 2 carboxyl groups, said salt melting below 100° C.

CHARLES B. BISWELL.

REFERENCES CITED

The following references are of record in the file of this patent:

UNITED STATES PATENTS

| Number | Name | Date |
|---|---|---|
| 1,859,529 | Rathsburg | May 24, 1932 |
| 2,033,203 | McGill | Mar. 10, 1936 |
| 2,131,127 | Horst | Sept. 27, 1938 |
| 2,353,690 | Clarkson | July 18, 1944 |
| 2,409,883 | Migrdichian | Oct. 22, 1946 |
| 2,481,526 | Nagy | Sept. 13, 1949 |

FOREIGN PATENTS

| Number | Country | Date |
|---|---|---|
| 122,482 | Austria | Dec. 15, 1930 |
| 463,576 | Germany | July 12, 1928 |
| 126,501 | Switzerland | June 10, 1926 |